United States Patent [19]

McGrath

[11] 4,025,159

[45] May 24, 1977

[54] CELLULAR RETROREFLECTIVE SHEETING

[75] Inventor: Joseph M. McGrath, Maplewood, Minn.

[73] Assignee: Minnesota Mining and Manufacturing Company, St. Paul, Minn.

[22] Filed: Feb. 17, 1976

[21] Appl. No.: 658,284

[52] U.S. Cl. .............................. 350/105; 156/272; 260/77.5 AM
[51] Int. Cl.² ......................................... G02B 5/128
[58] Field of Search ........................ 350/102–105, 350/106, 292, 288; 156/99–106, 1, 331, 332, 272; 260/77.5 SM

[56] References Cited

UNITED STATES PATENTS

| | | | |
|---|---|---|---|
| 3,140,340 | 7/1964 | Weber | 350/105 |
| 3,190,178 | 6/1961 | McKenzie | 350/105 |
| 3,558,387 | 12/1970 | Bassmir | 156/99 |
| 3,681,167 | 8/1972 | Moore | 156/99 |
| 3,924,929 | 12/1975 | Holmen et al. | 350/103 |

Primary Examiner—John K. Corbin
Assistant Examiner—B. Wm. delos Reyes
Attorney, Agent, or Firm—Cruzan Alexander; Donald M. Sell; Roger R. Tamte

[57] ABSTRACT

Cellular retroreflective sheeting, which comprises a base layer of retroreflective elements and a transparent cover film supported in spaced relation away from the base layer by a network of narrow intersecting bonds that form hermetically sealed cells within which retroreflective elements are isolated from retroreflective elements of different cells, is given greater durability by use of bonds that are cured in situ after they have been thermoformed into sealing contact between the cover film and base layer.

15 Claims, 8 Drawing Figures

4,025,159

CELLULAR RETROREFLECTIVE SHEETING

BACKGROUND OF THE INVENTION

The present invention is first of all an advance in the art of film-covered, exposed-lens retroreflective sheeting such as taught in McKenzie, U.S. Pat. No. 3,190,178. Such sheeting, which offers the brightest retroreflection of any known retroreflective sheeting made from glass microspheres, comprises (1) a base sheet in which a dense monolayer of transparent microspheres is partially embedded and partially exposed, with a specular reflective metal layer underlying the embedded surfaces of the microspheres, (2) a transparent cover film disposed in spaced relation above the layer of microspheres, and (3) a network of narrow, intersecting polymer-based bonds that extend over the surface of the base sheet to adhere the base sheet and cover film together and to divide the space between the base sheet and cover film into hermetically sealed cells or pockets in which the microspheres have an air interface. This "exposed-lens" construction (that is, with the microspheres having an air interface) is responsible for the bright retroreflection provided by such sheeting.

A special challenge with such sheeting is to obtain lasting bonds between the cover film and base sheet. The bonds in existing commercial sheeting have been susceptible to largely two kinds of disruption: (1) disruption caused by the heat and pressure used to apply reflective sheeting to a base substrate such as a traffic sign blank, and (2) disruption caused by outdoor weathering, including extremes of temperature cycling; rain, snow, ice and other forms of precipitation or moisture; and sunlight. Upon failure of the bonds, moisture can cover the exposed faces of the microspheres, whereupon the microspheres do not focus light rays onto the specular reflective layer on the back of the microspheres as they otherwise would, and retroreflection is very greatly reduced. The utility of film-covered exposed-lens retroreflective sheeting would be greatly expanded if some way were found to provide bonds of greater durability.

Another hermetically sealed cellular reflective sheeting that could benefit from improved bond strength between a cover film and base sheet is so-called "cube-corner" sheeting. Some varieties of cube-corner sheeting include a clear, transparent base sheet having a flat front surface, which serves as the front face of the sheeting, and a rear surface configured with cube-corner elements. A cover film is desired at the rear of the sheeting to maintain an air-interface for the cube-corner elements and also to provide a flat rear surface for bonding the sheeting to a substrate. A network of bonds as described above is potentially useful to hold the cover film to the base sheet, but again these bonds should provide a more lasting hermetic seal than has been available in the past.

SUMMARY OF THE INVENTION

In brief summary, retroreflective sheeting of the present invention incorporates a network of bonds, which are initially thermoformed into sealing contact between the cover film and base sheet, but which are subsequently cured in situ after the thermoforming operation. Preferably the bonds are initially formed by the procedure described in McKenzie, U.S. Pat. No. 3,190,178, namely by displacing binder material either from the base sheet into contact with the cover film (in "exposed-lens" varieties) or from the cover film into contact with the base sheet (in cube-corner varieties).

Prior to displacement, the binder material is generally a room-temperature-solid that may be controllably thermoformed to form a hermetic seal. In areas subjected to heat and pressure, the binder material flows into contact with the surface against which it is pressed (i.e. cover film or base sheet); and then, after removal of heat and pressure, returns to a self-sustaining form. (By "thermoforming" it is meant that a material is subjected to heat and usually pressure so as to cause it to flow into good contact with a substrate, i.e. "wet" the substrate, and then retain the shape into which it has been formed after removal of heat and pressure.) While in that self-sustaining form, the binder material is cured in situ ("curing" is used herein to describe chemical reactions of constituent ingredients, such as cross-linking or chain-extension reactions, which result in relative insolubility and infusibility of the cured material). Generally the curing is initiated by subjecting the sheeting to radiation—such as electron beam, ultraviolet, nuclear, or microwave—which typically activates one or more ingredients in the binder material, whereupon chemical reaction follows.

Greatly improved results are achieved by the use of such cured bonds. Sheeting of the invention can be laminated to a substrate such as a sign board with much greater latitude in heat and pressure than with existing commercial products, thus making the lamination operation more convenient and rapid and minimizing wastage. Further, in outdoor weathering tests at test sites, sheeting of the invention has demonstrated a higher resistance to degradation than existing film-covered exposed-lens products.

The invention also permits greater latitude during manufacture, since the initial thermoforming can often be performed more easily, because of the presence of low-molecular-weight curable ingredients; and it is not necessary to fully depend on the thermoforming to obtain a lasting hermetic seal.

The reasons for the improvement in results are not fully understood. It is recognized that a cured or cross-linked material may exhibit improved internal strength properties. But the present bonds do more than that, since they have improved adhesion to the cover film. In some embodiments of the invention, for example, the cover film can be pulled away from the bonds intact before the bonds are cured, and in some cases be visibly free of bond material, while it cannot be pulled away in that manner after curing.

While not limiting ourselves to a particular mechanism, it is theorized that when the bonds are first formed undr heat and pressure, some of the bond material migrates into the cover film (or base sheet in cube-corner varieties). Upon the later curing of the bond the migrated material may become more firmly interlocked or intertwined with the molecular structure of the cover film to achieve greater resistance to a pulling apart of the cover film and base sheet material.

In addition, under certain curing conditions such as curing induced by electron-beam or ultraviolet radiation, and in certain embodiments of sheeting, a minor amount of chemical reaction may occur between the cover film (or base sheet) and the bond; for example, the radiation may cause loss of hydrogen atoms from the material of the cover film (or base sheet), whereupon that material reacts with a reactive site, such as unsaturation, in the material of the bond. But whatever the explanation, the improved adherence between the cover sheet and base sheet provides a significant advance in cellular retroreflective sheeting.

DETAILED DESCRIPTION

Figure 1:
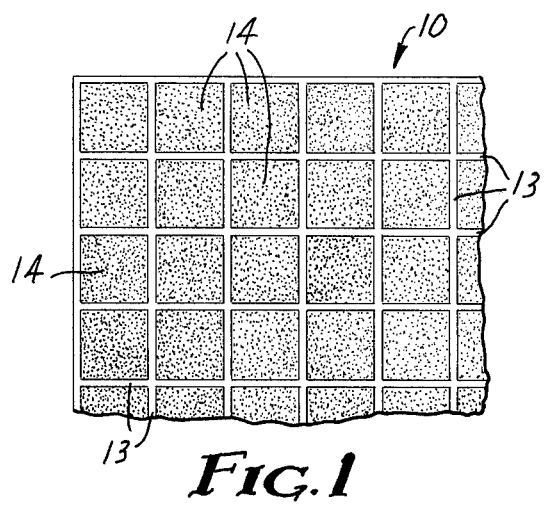
FIG. 1 is a top view of a portion of exposed-lens cellular retroreflective sheeting of the invention.
Figure 3:
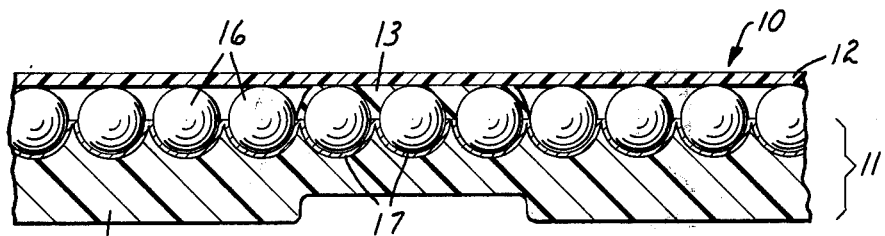
FIG. 3 is a cross-sectional view of a portion of completed exposed-lens cellular retroreflective sheeting of the invention.

As shown in FIGS. 1 and 3, a representative exposed-lens retroreflective sheeting 10 of the invention comprises a base sheet 11, a transparent cover sheet or film 12, and narrow intersecting bonds 13 which attach the base sheet and cover film together and separate the space between them into hermetically sealed cells or pockets 14.

Figure 2:
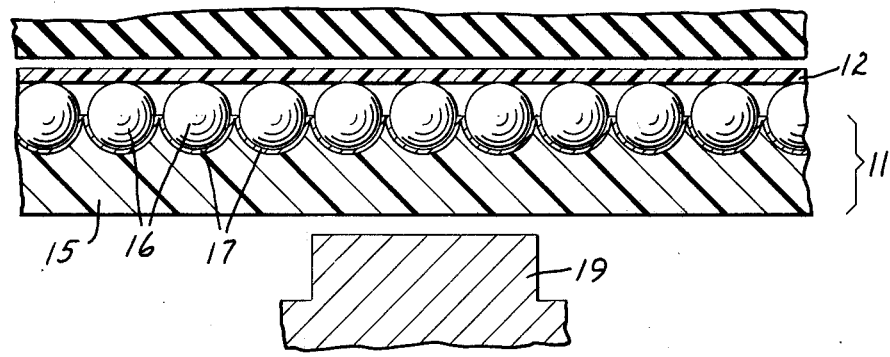
FIG. 2 is an enlarged schematic sectional view of apparatus and sheet components in the course of manufacture of exposed-lens cellular retroreflective sheeting of the invention.
Figure 4:
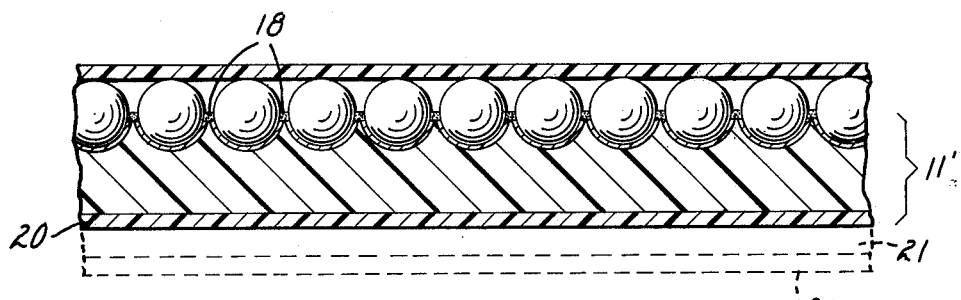
FIG. 4 is a cross-sectional view of a different completed exposed-lens cellular retroreflective sheeting of the invention.

As shown in FIGS. 2 and 3, the base sheet 11 typically includes a support layer 15 of binder material, a monolayer of transparent microspheres 16, which are partially embedded in the support layer and partially exposed above the support layer, and specular light-reflecting means underlying and in optical connection with the embedded surface of the microspheres. In the illustrated sheeting of the invention, the specular reflective means comprises specular reflective material 17, such as metal or such as dielectric material as described in Bingham, U.S. Pat. No. 3,700,305, coated onto the embedded surface of the microspheres, as by vapor-deposition. FIG. 4 shows a variation of base sheet material 11' which includes an additional binder material 18 that can assist in forming bonds to the cover film.

A base sheet material 11 or 11' as illustrated in FIGS. 3 and 4 can be prepared by procedures well known in the art, such as described for example in McKenzie, U.S. Pat. No. 3,190,178. The assembly of cover film 12 and base sheet 11 may then be pressed, as also described in the McKenzie patent, by inserting the two sheets between a pair of heated platens. One platen is an embossing platen having a pattern of raised ridges (represented by 19 in FIG. 2). The ridges on the embossing platen press against the base sheet material 11 to deform the support layer 15 onto the configuration shown in FIG. 3. The support layer is heated and pressed sufficiently so that it floods the microspheres in the area pressed and contacts the cover film 12. The pattern of ridges on the embossing platen is such as to form the network of narrow bonds illustrated in FIG. 1. If desired, a support film 20 (see FIG. 4) may be laminated to the support layer prior to, or during, the embossing operation to separate the embossing platen from the support layer. In addition, the sheeting may include a layer of adhesive 21 shown in dotted lines in FIG. 4 and a release liner 22.

Following the embossing operation, the cover film 12 continues to be in spaced relation with the microspheres 16. Very little spacing, as thin as a monomolecular layer of air, for example, provides the necessary air interface to obtain desired optical effects. Following the embossing operation, the sheet material has the desired hermetic cells covered by a cover film, and surrounded on all borders by a polymer-based bond.

To complete retroreflective sheeting of the invention, the embossed sheeting is then exposed to a predetermined level of radiation, which causes the binder material 15 to cure to a relatively infusible and insoluble condition. Rapidly acting forms of radiation, i.e. requiring application for less than 5 minutes and preferably for less than 5 seconds, are strongly preferred for reasons of economy as well as to minimize handling of the product while the bonds are at less than finished strength. Electron-beam radiation is especially desired because of its ability to penetrate even heavily pigmented coatings, its speed and efficient use of applied energy, and its ease of control. Other useful forms of radiation include ultraviolet light; nuclear radiation; microwave radiation; and heat, though at present heat radiation requires unpreferred long times of application.

Binder materials that will undergo curing under radiation are well known in the art. Materials useful in the present invention are typically room-temperature-solids that will soften to a flowable state when heated to temperatures between about 25° and 150° C. Under pressure of an embossing platen the binder material flows sufficiently to wet the cover film and to flood the microspheres in the area pressed, but it does not flow significantly into areas that are not pressed, and thereby leaves the described cell or pocket of exposed microspheres. Further, once the heat and pressure are removed, the binder material will hold its thermoformed shape.

The described binder material includes one or more ingredients that are activated in the presence of the described radiation (as by formation of free radicals through loss or transfer of hydrogen atoms or decomposition of initiator molecules). The activated molecules then react with an active site, such as double bond, on another molecule to start a polymer chain or initiate crosslinking. In some cases, the binder material comprises a polymeric matrix material and a monomer, which is the ingredient principally activated by the radiation. The polymeric matrix material may or may not participate in the reaction, for example, through the presence of preradiation reactive groups or because of activation of the polymer molecule as by loss of hydrogen atoms. In other cases, the binder material may consist only of polymeric material having groups that are activated by radiation and also, perhaps, containing preradiation reactive groups.

Acrylic-based ingredients are especially useful binder materials ("acrylic-based ingredients" as used herein means acrylic or methacrylic acid or ingredients obtained from acrylic or methacrylic acid). Typical useful acrylic-based monomers are polyethylene glycol diacrylates; 1,6-hexanediol diacrylate; hydroxymethyl diacetone acrylamide; and 2-cyanoethyl acrylate; and typical acrylic-based polymeric materials are acrylate or methylacrylate polymers or copolymers. Other useful binder materials are represented by diallyl glycol carbonate; and saturated or unsaturated polyester or polyurethane resins.

Compositions that cure in the presence of ultraviolet radiation typically include a sensitizer such as a benzoin ether or a benzophenone derivative in addition to a reactive monomer and a polymeric binder material. Catalysts for initiating curing in the presence of either thermal or microwave radiation include peroxides such as benzoyl peroxide and azo compounds such as azobisisobutyronitrile.

An especially useful transparent cover film comprises polymethylmethacrylate, which maintains its clarity and other properties very well under outdoor weathering conditions. Polycarbonate films are also useful, and especially where outdoor durability is not important, films such as polyethylene terephthalate, cellulose acetate, and cellulose acetate butyrate may be used. The cover films are typically between about 1 and 5 mils in thickness, though they may have other thicknesses also. In addition to thermoplastic cover films as described, cover films that will undergo reaction both internally and with the material of the bonds may be used.

One surprising aspect of the invention is the fact that some binder materials do not provide improved bonds to all types of materials. For example, the acrylic binder materials as used in the examples do not form a bond to the polyethylene terephthalate carrier sheet on which they are carried. Useful films and binder materials can be selected by the razor blade test reported in Example 1.

The microspheres are generally less than 200 micrometers in diameter and greater than 10 or 15 micrometers in diameter and preferably are between about 25 and 80 micrometers in diameter. The microspheres preferably have an index of refraction of 1.91, though they may have other indices for other constructions of sheeting, such as sheeting that includes a transparent space coat between the microspheres and specular reflective means.

The support layer of binder material in retroreflective sheeting as shown in FIGS. 1–4 should generally be at least about as thick as the average diameter of the microspheres employed, and may approach two or three times the diameter of the microspheres employed. Although displacement of binder material from a support layer is the preferred way to form bonds, because of the fewer steps in such an operation, minimization of interfaces within the sheeting, and controlled shaping of bonds into neat narrow lines, the bonding material may also be introduced into the sheeting separately from the support layer, as a separate sheet preformed in an open-mesh pattern, for example. Such a separately introduced bonding material is then thermoformed into contact with the cover film and base sheet prior to curing. The thermoforming in this case may require that only the edge-portions of the preformed structure flow into sealing contact with the substrate against which it is pressed. Further, rather than displacing material from a base sheet or cover film, a bond structure may be formed prior to assembly of the cover sheet and base sheet, as by molding such bond structure at the time of molding a cube-corner structure. During assembly of the base sheet and cover sheet, the preformed bond structure is then thermoformed into sealing contact with the cover sheet or base sheet, either by thermoforming of the bond structure or of the surface it engages.

Figure 5:
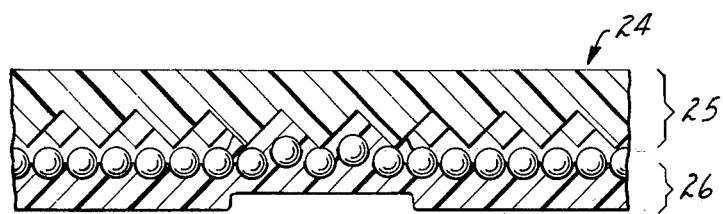
FIGS. 5–8 are cross-sectional views of cube-corner cellular reflective sheeting of the invention.
Figure 6:
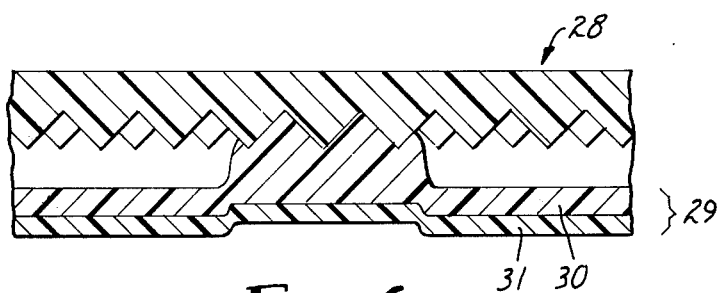
Figure 7:
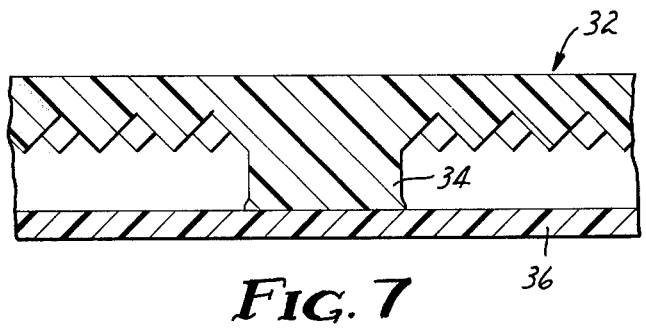
Figure 8:
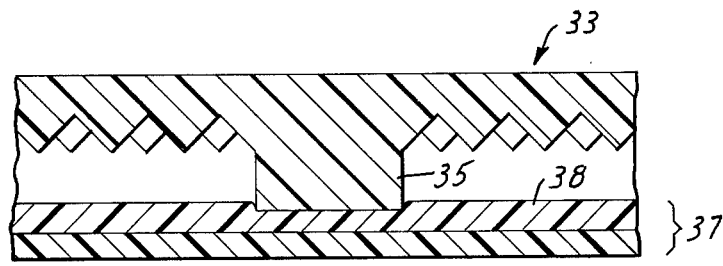

FIGS. 5–8 ilustrate cube-corner varieties of sheeting of the invention, which are generally prepared in the same manner as the exposed-lens varieties described above. FIG. 5 is a combination cube-corner exposed-lens product of the general type described in Weber, U.S. Pat. No. 3,140,340. Such products have bright retroreflectivity, especially at large angles of incidence (measured from a plane perpendicular to the front face of the sheeting) at which reflectivity of cube-corner reflective sheetings normally falls off rapidly. In a construction 24 as shown in FIG. 5 the cube-corner sheet 25 can be thought of as the "cover film" for the base sheet 26. FIG. 6 shows a sheeting 28 which includes no glass microspheres, and in which the cover sheet 29 comprises a radiation-curable composition 30 and a support or carrier film 31. FIGS. 7 and 8 show retroreflective sheeting, 32 and 33, respectively, in which bonds 34 and 35 are preformed on a cube-corner sheeting and then pressed into contact with a cover sheet 36 and 37 (the bonds could also be preformed on the cover sheet, and such preformed bonds could also be used in microsphere sheeting of the invention). In the construction of FIG. 7 at least the bonds 34 comprise radiation-curable material and in the construction of FIG. 8 at least the layer 38 of the cover sheet 37 comprises radiation-curable material; preferably both the bonds 34 and the sheet 36 and the bonds 35 and layer 38 are radiationcurable.

Example 1

Glass microspheres ranging between about 50 and 80 micrometers in diameter are embedded by standard procedures to about 40 percent of their diameter in a 25-micrometer-thick layer of polyethylene which is carried on paper, after which the microsphere-covered side of the web is vapor-coated with aluminum. A radiation-curable composition is then prepared by mixing the following ingredients:

| | Parts by Weight |
|---|---|
| Copolymer including 45 percent ethyl acrylate and 55 percent methyl methacrylate dissolved in xylene to give a 37.6 percent solids solution | 164.9 |
| Polyethylene glycol (200) diacrylate | 19.0 |
| Rutile titanium dioxide pigment | 18.5 |
| Stearic acid | 0.5 |

This composition is knife-coated over the vapor-coated glass microspheres in the polyethylene-coated web, after which most of the solvent from the composition is removed by heating the web in an oven. The result is a support layer 15 as shown in FIG. 2 about 60 micrometers thick. A polyethylene terephthalate film having a pressure-sensitive adhesive layer on one surface is then laminated to the radiation-curable support layer by passing the web and film through a set of pressure rollers, with the adhesive side against the support layer.

The polyethylene-covered paper is then stripped away, leaving a base sheet material 11 as shown in FIG. 2. This base sheet material and a biaxially oriented polymethyl methacrylate film 75 micrometers thick are inserted together in the manner shown in FIG. 2 between two platens, one being smooth-surfaced and the other being a steel platen having a pattern of 0.75-millimeter-high, 0.25-millimeter-wide ridges and heated to 150° C. This operation laminates the cover film to the base sheet by a network of bonds as illustrated in FIGS. 1 and 3. The resulting sheeting is then irradiated with a 190-kilovolt electron beam to give a dosage of 1.5 megarads.

To illustrate the improved bond obtained by use of the cured binder material, the following comparison may be made: A 0.6 millimeter-thick film was prepared by knife-coating the radiation-curable composition described above onto a silicone-treated release paper and then oven-drying the coating. Two sections were cut from this film, removed from the liner, and each laminated under 250 pounds per square inch (111.7 × $10^6$ newton per square meter) at 220 ° F (105° C) to a cast polymethylmethacrylate sheet using a smooth-surfaced platen press. One of the samples was then irradiated with a 190-kilovolt electron beam to a dose of 1.5 megarads, after which the adhesion between each sample of the film and the polymethylmethacrylate was checked by attempting to separate them with a single-edged razor blade. The uncured film could be easily removed, but the irradiated film was very tightly bound and could not be cleanly separated from the polymethylmethacrylate sheet.

EXAMPLE 2

Example 1 was repeated using a radiation-curable composition prepared from the following ingredients:

| | Parts by Weight |
|---|---|
| Terpolymer including 52.5 percent methyl methacrylate, 43 percent ethyl acrylate, and 4.5 percent isooctyl acrylate dissolved in xylene at 33.3 percent solids | 150 |
| Polyethylene glycol (200) diacrylate | 33 |
| Rutile titanium dioxide pigment | 42 |
| Stearic acid | 0.45 |

Following the embossing operation, some of the sheeting was irradiated with a 190-kilovolt electron beam to a dose of 1.5 megarads. Square samples, 6 centimeters on a side, of both irradiated sheeting and sheeting that had not been irradiated were mounted on aluminum panels for heat-shrink testing. After 30 minutes at 200° F, the cover film of the uncured sheeting had shrunk, but the irradiated sheeting showed no shrinkage. After 20 hours at 200° F (93° C), the cover film of the uncured sheeting had shrunk severely and was almost completely delaminated from the base sheeting. The irradiated sheeting showed only slight shrinkage and delamination after 20 hours at 200° F (93° C).

EXAMPLE 3

Example 1 was repeated using the following radiation-curable material or composition:

| | Parts by Weight |
|---|---|
| Copolymer including 45 percent ethyl acrylate and 55 percent methyl methacrylate dissolved in 2-ethoxyethyl acetate to give a 29.9-percent-solids solution | 200.7 |
| 1,6-hexanediol diacrylate | 21.0 |
| Rutile titanium dioxide pigment | 18.7 |
| Stearic acid | 0.3 |

Following the embossing operation, the sheeting was irradiated with a 190-kilovolt electron beam to give a 1.5 megarad dose to provide a firmly bonded cover film.

EXAMPLE 4

Example 1 was repeated using a radiation-curable composition prepared from the following ingredients:

| | Parts by Weight |
|---|---|
| Terpolymer including 52.5 percent methyl methacrylate, 43 percent ethyl acrylate, and 4.5 percent isooctyl acrylate dissolved in xylene at 43.9 percent solids | 141.2 |
| Polyethylene glycol (200) diacrylate | 19.0 |
| Stearic acid | 0.5 |
| Benzoin ethyl ether | 2.0 |

Following the embossing operation, the sheeting was irradiated with ultraviolet light using two passes at 50 feet per minute (15 meters per minute) with two 200 watt per inch (80 watt per centimeter) medium-pressure mercury lamps in a PPG Radiation Polymer Company Model QC 1202 N/A ultraviolet light processor and a reflective sheeting having a firmly bonded cover sheet resulted.

EXAMPLE 5

Example 1 was repeated using the following radiationcurable composition:

| | Parts by Weight |
|---|---|
| Linear saturated polyester resin (Vitel PE 222 supplied by Goodyear Chemicals) | 160.0 |
| Diallyl glycol carbonate ("CR-39" supplied by PPG Industries) | 40.0 |
| Methyl ethyl ketone | 100.0 |
| Xylene | 40.0 |

Two kinds of retroreflective sheeting were prepared, one using an oriented 75-micrometer-thick polymethylmethacrylate top film and the other using a 75-micrometer-thick polycarbonate film ("Lexan" supplied by General Electric). These products were subjected to 5 megarad and 25 megarad doses, respectively, of 190-kilovolt electron beams. Retroreflective sheeting having a firmly bonded cover film was prepared in both cases.

EXAMPLE 6

A radiation-curable composition was prepared from the following ingredients:

| | Parts by Weight |
|---|---|
| Copolymer including 70 percent methyl methacrylate and 30 percent octyl acrylate | 50.0 |
| Polyethylene glycol (200) diacrylate | 35.0 |
| 2-hydroxyethyl acrylate | 15.0 |

This composition, which, as noted, includes no solvent, was knife-coated while warm over a web comprising glass microspheres vapor-coated with aluminum and partially embedded in a polyethylene film on a paper carrier. A polyethylene terephthalate film carrying a layer of pressure-sensitive adhesive was laminated to the resulting support layer and the paper carrier for the polyethylene film removed. The polyethylene film was removed while the web was subjected to a temperature of about −40° C. The resulting base sheet was pressed, together with an oriented polymethyl methacrylate film, between a rubber platen and a ridged heated steel platen, after which the resulting sheeting was irradiated with a 190-kilovolt electron beam to a dosage of 2.5 megarads. Satisfactory retroreflective sheeting having a firmly bonded cover film was prepared.

EXAMPLE 7

A radiation-curable composition was prepared from the following ingredients:

|  | Parts by Weight |
| --- | --- |
| Terpolymer consisting of 52.5 percent methyl methacrylate, 43 percent ethyl acrylate and 4.5 percent isooctyl acrylate dissolved in xylene to give a 43.9 percent solids solution | 136.7 |
| Polyethylene glycol (200) diacrylate | 20.0 |
| Rutile titanium dioxide pigment | 18.0 |
| Stearic acid | 2.0 |
| Xylene | 40.0 |

This composition was used to make retroreflective sheeting in the manner described in Example 1 using as a cover film a 75-micrometer-thick polycarbonate (Lexan film supplied by General Electric). The embossed sheeting was irradiated with a 190-kilovolt electron beam to a 1.5 megarad dosage and prepared satisfactory retroreflective sheeting with a firmly bonded cover film.

EXAMPLE 8

A radiation-curable composition was prepared from the following ingredients:

|  | Parts by Weight |
| --- | --- |
| Copolymer consisting of 45 percent ethyl acrylate and 55 percent methyl methacrylate dissolved in 2-ethoxyethyl acetate/2-propanol to give a 32.4 percent solids solution | 100 |
| Hydroxymethyl diacetone acrylamide | 5 |

This composition was used to make satisfactory retroreflective sheeting in the manner described in Example 1 using a 170-kilovolt electron beam to give a 2.5 megarad dosage.

EXAMPLE 9

Example 8 was repeated except that 5 parts of 2-cyanoethyl acrylate was used instead of the hydroxymethyl diacetone acrylamide.

EXAMPLE 10

A radiation-curable composition was prepared from the following ingredients:

|  | Parts by Weight |
| --- | --- |
| Copolymer consisting of 45 percent ethyl acrylate and 55 percent methylmethacrylate dissolved in 2-ethoxyethyl acetate to give a 29.9 percent solids solution | 200.7 |
| Polyethylene glycol (200) diacrylate | 21 |
| Rutile titanium dioxide pigment | 18.7 |
| Stearic acid | 0.3 |

The above composition was knife-coated over a 25-micrometer-thick polyethylene terephthalate film and oven-dried, after which it was laminated in the presence of heat and pressure to the microsphere-side of a polyethylene-coated carrier web in which the microspheres were partially embedded in the polyethylene coating and had been vapor-coated with aluminum. The polyethylene-coated carrier web was then stripped away from the microspheres whereupon the resulting base sheet material was pressed together with polymethylmethacrylate film between two platens, one being a smooth-surfaced rubber platen and the other being a heated embossing platen. The resulting embossed sheeting was electron beam irradiated with a 3 megarad dose at 190-kilovolts to give a product having improved seal-strength and heat-stability.

EXAMPLE 11

Retroreflective sheeting was prepared from the following ingredients using the procedures given in Example 1:

|  | Parts by Weight |
| --- | --- |
| Terpolymer consisting of 52.5 percent methylmethacrylate, 43 percent ethyl acrylate and 4.5 percent isooctyl acrylate dissolved in xylene to give a 43.9 percent solids solution | 136.7 |
| Polyethylene glycol (200) diacrylate | 20 |
| 2,2'-Azobis(2-methylpropionitrile) | 4 |
| Acetone | 20 |

Biaxially oriented, 75-micrometer-thick polymethylmethacrylate film and 75-micrometer-thick polycarbonate film (Lexan supplied by General Electric) were used as cover films. The embossed sheeting was thermally cured by heating for 16 hours at 65° C. Either uncured sheeting construction required about $7 \times 10^5$ dynes per centimeter width (4 pounds per inch width) to pull the cover film away from the base sheet. After the curing operation, a force of $21 \times 10^5$ dynes per centimeter width (12 pounds per inch width) was not sufficient to separate either cover film from the base sheet.

EXAMPLE 12

Example 1 was repeated except that a radiationcurable composition as described below was used, and a variety of different radiation conditions were used. The different radiation conditions illustrate the effects of different depths of penetration caused by different-voltage electron beams and by different directions of radiation. The different conditions all provided radiation doses of 1.5 megarads, but used electron beams directed at the back side of the sheeting (i.e. polyethylene terephthalate side) of 150, 160, 170, 180, and 190 kilovolt, respectively; a 190-kilovolt beam directed at the front, and 190-kilovolt beams directed at both the front and back. After radiation was completed, the polyethylene terephthalate film was removed from each kind of sheeting, and a pressure-sensitive adhesive laminated to the exposed surface. Thereupon, 7.6-cm/sq. test samples were adhered to an aluminum sheet by the layer of adhesive. A control sample of sheeting prepared without any radiation and a sample of commerical sheeting made according to McKenzie, U.S. Pat. No. 3,190,178 were also made. The samples were then heated to 93° C (200° F) for 3 hours, which subjected the samples to shrinking forces that tested the strength by which the bonds held the cover film in place. After heating, the portion of the area of each sample that exhibited no shrinkage (i.e. was taut and unwrinkled) was measured. Results are reported in Table I.

| Composition | Parts by Weight |
|---|---|
| Terpolymer consisting of 52.5% methyl methacrylate, 43% ethyl acrylate and 4.5% isooctyl acrylate dissolved in xylene to give a 43.9% solids solution. | 153.8 |
| Polyethylene glycol (200) diacrylate | 14.0 |
| Rutile titanium dioxide pigment | 18.0 |
| Stearic acid | 0.5 |
| Xylene | 50.0 |

TABLE I

| Sample No. | Back Radiation | Front Radiation | Unaffected Area (Percent) |
|---|---|---|---|
| Control | None | None | 16 |
| A | 1.5 Mrad, 150 KV | None | 66 |
| B | 1.5 Mrad, 160 KV | None | 73 |
| C | 1.5 Mrad, 170 KV | None | 72 |
| D | 1.5 Mrad, 180 KV | None | 85 |
| E | 1.5 Mrad, 190 KV | None | 85 |
| F | None | 1.5 Mrad, 190 KV | 77 |
| G | 1.5 Mrad, 190 KV | 1.5 Mrad, 190 KV | 88 |
| (Commercial sheeting made according to McKenzie, U.S. Pat. No. 3,190,178) | | | 13 |

These tests indicate that for most purposes radiations of over 170 KV should be used, and that radiations of 180 or more are preferred, as is use of combined front and back radiation.

EXAMPLE 13

Example 1 was repeated except that a radiationcurable composition as listed below was used and the "cover film" was a flexible 250-micrometer-thick acrylic film having an array of miniature cube-corner retroreflective elements 125 micrometers in depth embossed into one side. The cube-corner side of the cover film was bonded to the base sheet. The resulting product was a combination cubecorner reflector and beaded sheeting reflector as shown in FIG. 5. The retroreflectivity of the sample as measured by a Gamma Scientific Model 2009 Auto-Telephotometer is reported in Table II. The sample was illuminated at various angles of incidence (the angles are measured from a plane perpendicular to the front face of the sheeting), and the amount of light reflected was measured at an angle of 0.2° from the angle of incidence. The sample was tested under two conditions: with the sample oriented within the plane in which it lies (1) so as to provide maximum reflectivity at 5° incidence angle and (2) so as to provide minimum reflectivity at the 5° incidence angle.

| Composition | Parts by Weight |
|---|---|
| Terpolymer consisting of 52.5% methyl methacrylate, 43% ethyl acrylate, and 4.5% isooctyl acrylate dissolved in xylene to give 43.9% solids solution | 1407 |
| Polyethylene glycol (200) diacrylate | 200 |
| Rutile titanium dioxide pigment | 179 |
| Stearic acid | 4.0 |
| Xylene | 500 |

EXAMPLE 14

The radiation-curable composition used in Example 13 was coated on 25-micrometer-thick polyethylene terephthalate film and most of the solvent removed by heating the resulting web in an oven. The web was then heat-sealed to the flexible cube-corner film described in Example 13 to give a similar product except that it had no glass microspheres. This construction was cured from the back using a 190-kilovolt electron beam and a 1.5 megarad dose. The polyethylene terephthalate carrier film was then removed and an adhesive and protective liner laminated to the back of the sheeting. Reflectivity measurements are reported in Table II.

| | Reflectivity at Different viewing Angles (candlepower/foot candle/square foot) Incidence Angle | | | | | | | | |
|---|---|---|---|---|---|---|---|---|---|
| Example No. | 5° | 10° | 15° | 20° | 25° | 30° | 40° | 50° | 60° |
| Maximum Reflectivity: | | | | | | | | | |
| 14 | 617 | 573 | 518 | 423 | 302 | 301 | 254 | 88 | 393 |
| 13 | 1005 | 980 | 895 | 764 | 375 | 319 | 272 | 181 | 860 |
| Minimum Reflectivity: | | | | | | | | | |
| 14 | 537 | 528 | 490 | 408 | 150 | 41 | 9 | 2 | 0 |
| 13 | 854 | 920 | 1003 | 988 | 570 | 179 | 129 | 119 | 100 |

What is claimed is:
1. Retroreflective sheeting comprising (1) a base sheet having a layer of retroreflective elements disposed over one of its surfaces; (2) a cover sheet disposed in spaced relation from the layer of retroreflective elements; and (3) a network of narrow intersecting bonds extending between said cover sheet and base sheet and comprising binder material thermoformed at the point of contact between said bonds and at least one of said cover sheet and base sheet so as to adhere the two sheets together and form a plurality of cells within which retroreflective elements are hermetically sealed; characterized in that the binder material is selected from materials that show increased adhesion to said at least one of the cover sheet and base sheet when a solid layer of the material that has been previously laminated to said sheet is cured, and further characterized in that the binder material is cured in situ after being thermoformed, whereby the bonds have increased bond strength to the cover sheet and base sheet.

2. Sheeting of claim 1 in which the curing of said binder material is induced with an electron beam.

3. Sheeting of claim 1 in which said cured binder material comprises an acrylic-based ingredient.

4. Sheeting of claim 3 in which the cover sheet also comprises an acrylic-based ingredient.

5. Sheeting of claim 4 in which the acrylic-based ingredient is polymethylmethacrylate.

6. Sheeting of claim 1 in which the cover sheet includes ingredients that coreact with said binder material during curing of the binder material.

7. Sheeting of claim 1 in which said retroreflective elements comprise transparent microspheres.

8. Sheeting of claim 1 in which said retroreflective elements comprise cube-corner retroreflective elements.

9. Sheeting of claim 8 in which both the base sheet and cover sheet comprise radiation-curable material.

10. Retroreflective sheeting of claim 1 in which the surface of the cover film engaged by the bonds is configured to provide cube-corner retroreflective elements, and the layer of retroreflective elements disposed over a surface of the base sheet comprises transparent microspheres.

11. Retroreflective sheeting comprising (1) a base sheet that includes a support layer and a layer of transparent microspheres partially embedded in, and partially protruding out of, the support layer; (2) a transparent cover film disposed in spaced relation above the layer of microspheres; and (3) a network of narrow intersecting bonds comprising binder material thermoformed out of said support layer into sealing contact with the cover film so as to adhere the base sheet and cover film together and form a plurality of cells within which microspheres are hermetically sealed and have an air interface; characterized in that the binder material is selected from materials that show increased adhesion to the cover sheet when a solid layer of the material that has been previously laminated to the cover sheet is cured, and further characterized in that the binder material is cured in situ by exposure to an electron beam after being thermoformed into contact with the cover film, whereby the bonds have increased bond strength to the cover film.

12. Sheeting of claim 11 in which the cured binder material comprises an acrylic-based ingredient.

13. Sheeting of claim 12 in which the transparent cover film also comprises an acrylic-based ingredient.

14. Sheeting of claim 13 in which the acrylic-based ingredient is polymethylmethacrylate.

15. Sheeting of claim 11 in which the cover film includes ingredients that coreact with said bonds during curing of the bonds.

* * * * *